US012049736B2

(12) United States Patent
Impero et al.

(10) Patent No.: US 12,049,736 B2
(45) Date of Patent: Jul. 30, 2024

(54) SYSTEM FOR ILLUMINATING A CARRIAGEWAY IN A CASE OF FOG

(71) Applicant: Pasquale Impero, Casalnuovo di Napoli (IT)

(72) Inventors: Pasquale Impero, Casalnuovo di Napoli (IT); Vincenzo Musone, Marcianise (IT); Giovanni Laudante, Villa di Briano (IT); Alvise Bellesini, Sant'Anastasia (IT)

(73) Assignee: Pasquale Impero (IT)

( * ) Notice: Subject to any disclaimer, the term of this patent is extended or adjusted under 35 U.S.C. 154(b) by 376 days.

(21) Appl. No.: 17/635,883

(22) PCT Filed: Aug. 3, 2020

(86) PCT No.: PCT/IB2020/057315

§ 371 (c)(1),
(2) Date: Feb. 16, 2022

(87) PCT Pub. No.: WO2021/024155

PCT Pub. Date: Feb. 11, 2021

(65) Prior Publication Data

US 2022/0290387 A1 Sep. 15, 2022

(30) Foreign Application Priority Data

Aug. 6, 2019 (IT) ........................ 102019000014115

(51) Int. Cl.
*E01F 9/40* (2016.01)
*E01F 9/20* (2016.01)
(Continued)

(52) U.S. Cl.
CPC ................ *E01F 9/40* (2016.02); *F21S 8/085* (2013.01); *F21V 23/0442* (2013.01); *E01F 9/20* (2016.02);
(Continued)

(58) Field of Classification Search
CPC .. G09F 19/22; G09F 19/228; G09F 2019/223; G09F 13/0495; E01F 9/20;
(Continued)

(56) References Cited

FOREIGN PATENT DOCUMENTS

EP 0144458 A1 6/1985
JP H07320517 A * 12/1995
(Continued)

OTHER PUBLICATIONS

Machine translation of JP H07320517 A retrieved from the FIT database of PE2E search. (Year: 2024).*
(Continued)

*Primary Examiner* — Colin J Cattanach
(74) *Attorney, Agent, or Firm* — Endurance Law Group PLC

(57) ABSTRACT

A system for illuminating a carriageway in a case of fog includes a road safety barrier arranged along the carriageway, at least one fog density detecting device arranged along the road safety barrier, and a plurality of light sources borne by the road safety barrier, distributed along the road safety barrier, and oriented for each to emit a light beam having a direction that is transversal to an extension axis of the road safety barrier so as to illuminate signage on the carriageway. A control unit that is connected to the light sources and to the fog density detecting device is configured to activate the light sources when the fog density detecting device detects a fog density value of above a threshold value.

7 Claims, 8 Drawing Sheets

(51) Int. Cl.

| | |
|---|---|
| ***E01F 9/615*** | (2016.01) |
| ***E01F 15/00*** | (2006.01) |
| ***E01F 15/02*** | (2006.01) |
| ***E01F 15/04*** | (2006.01) |
| ***E01F 15/08*** | (2006.01) |
| ***F21S 8/08*** | (2006.01) |
| ***F21V 23/04*** | (2006.01) |
| ***F21W 131/103*** | (2006.01) |
| ***G09F 13/04*** | (2006.01) |
| ***G09F 19/22*** | (2006.01) |

(52) U.S. Cl.
CPC ............... *E01F 9/615* (2016.02); *E01F 9/617* (2016.02); *E01F 15/00* (2013.01); *E01F 15/003* (2013.01); *E01F 15/02* (2013.01); *E01F 15/025* (2013.01); *E01F 15/04* (2013.01); *E01F 15/0407* (2013.01); *E01F 15/0423* (2013.01); *E01F 15/043* (2013.01); *E01F 15/0438* (2013.01); *E01F 15/0446* (2013.01); *E01F 15/0453* (2013.01); *E01F 15/0461* (2013.01); *E01F 15/08* (2013.01); *E01F 15/081* (2013.01); *E01F 15/083* (2013.01); *E01F 15/085* (2013.01); *E01F 15/086* (2013.01); *F21S 8/086* (2013.01); *F21W 2131/103* (2013.01); *G09F 13/0495* (2021.05); *G09F 19/22* (2013.01); *G09F 2019/223* (2013.01); *G09F 19/228* (2013.01)

(58) Field of Classification Search
CPC ... E01F 9/40; E01F 9/615; E01F 9/617; E01F 15/00; E01F 15/003; E01F 15/02; E01F 15/025; E01F 15/04; E01F 15/0407; E01F 15/0423; E01F 15/043; E01F 15/0438; E01F 15/0446; E01F 15/0453; E01F 15/0461; E01F 15/08; E01F 15/081; E01F 15/083; E01F 15/085; E01F 15/086; F21W 2131/103; F21S 8/086
See application file for complete search history.

(56) References Cited

FOREIGN PATENT DOCUMENTS

| | | | | |
|---|---|---|---|---|
| KR | 200197318 | Y1 | * | 9/2000 |
| KR | 100901165 | B1 | * | 6/2009 |
| WO | WO2004/031487 | A1 | | 4/2004 |
| WO | WO2007/099574 | A2 | | 9/2007 |

OTHER PUBLICATIONS

Machine translation of KR 200197318 Y1 retrieved from the FIT database of PE2E search. (Year: 2024).*
Machine translation of KR 100901165 B1 retrieved from the FIT database of PE2E search. (Year: 2024).*

* cited by examiner

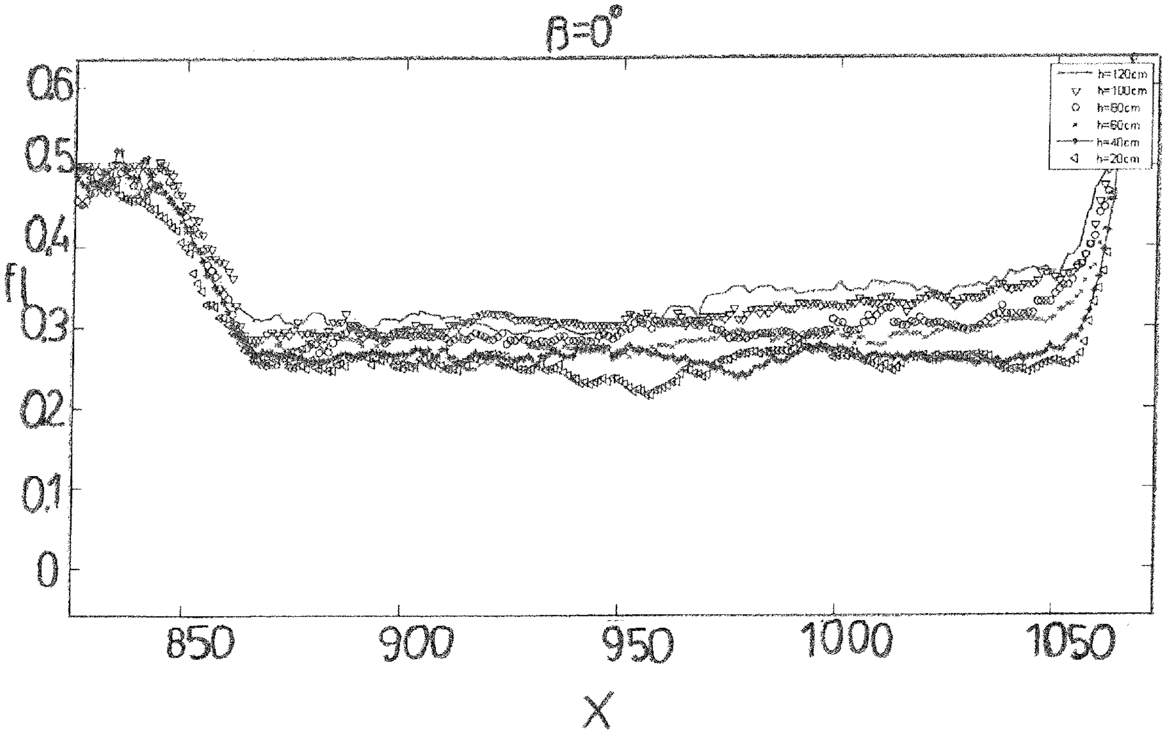
FIG.4
FIG.5
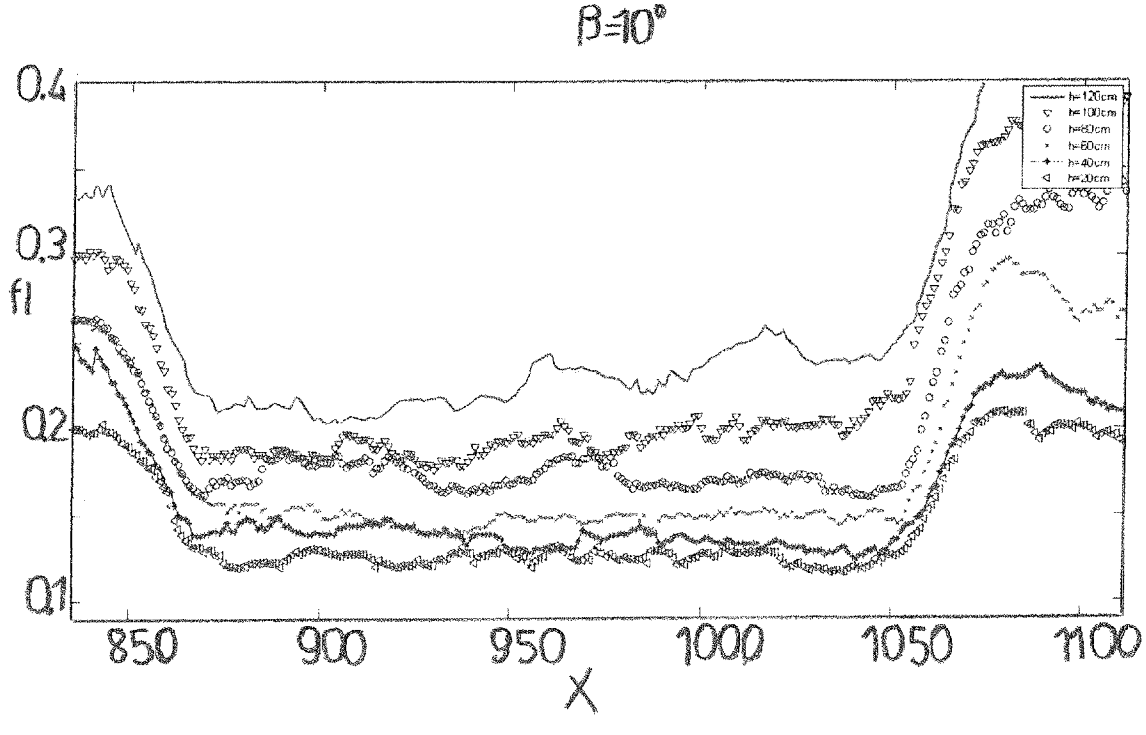

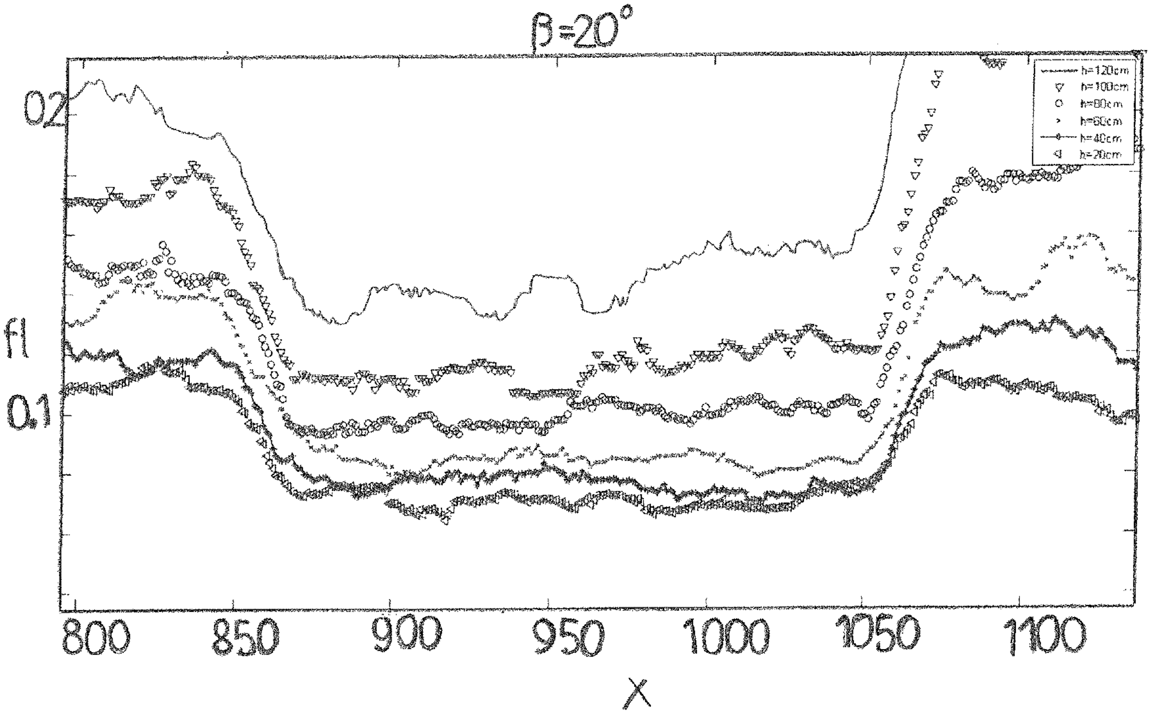
FIG. 6
FIG. 7
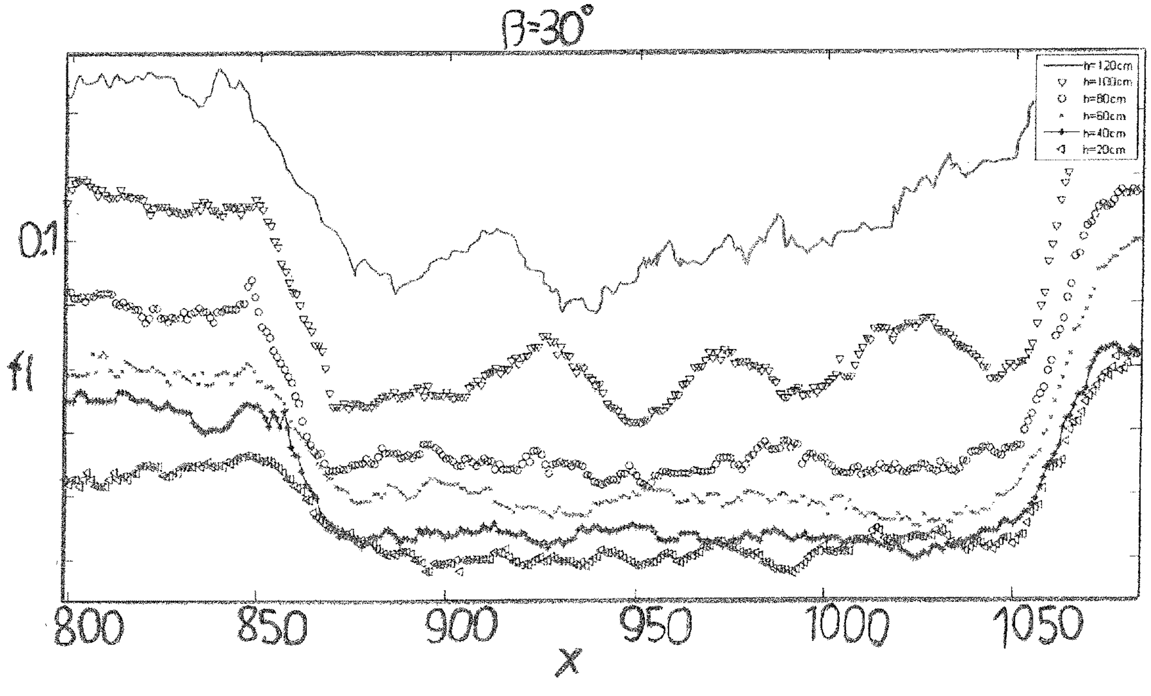

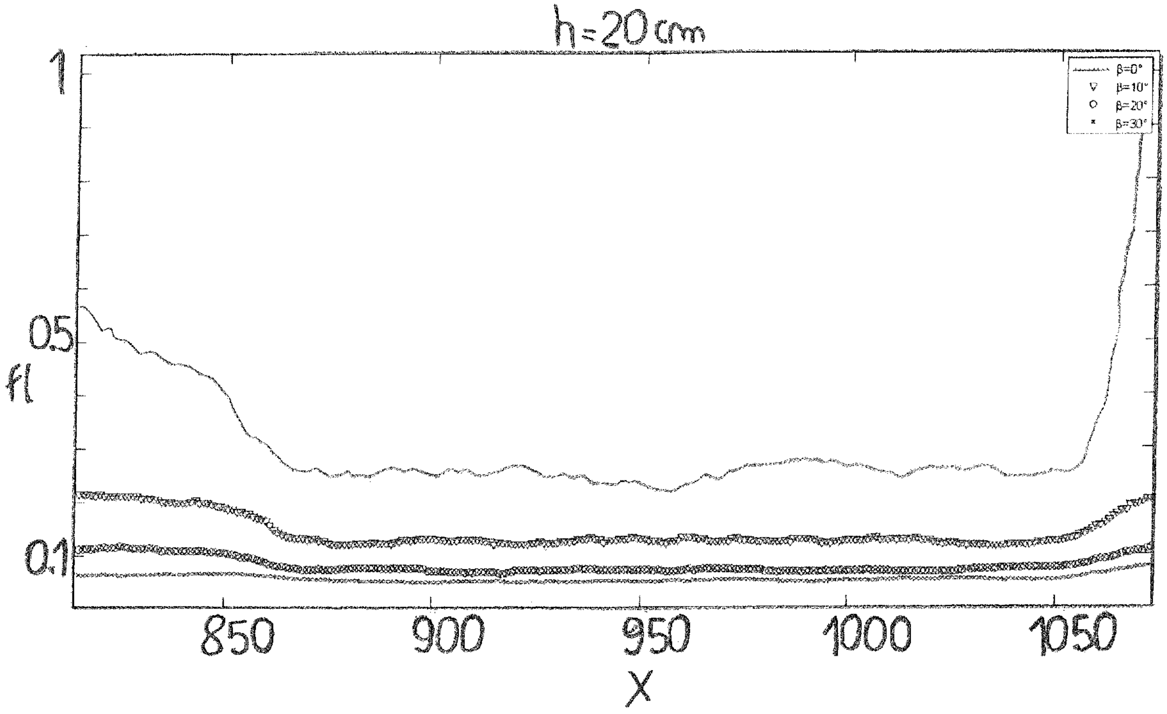
FIG. 8
FIG. 9
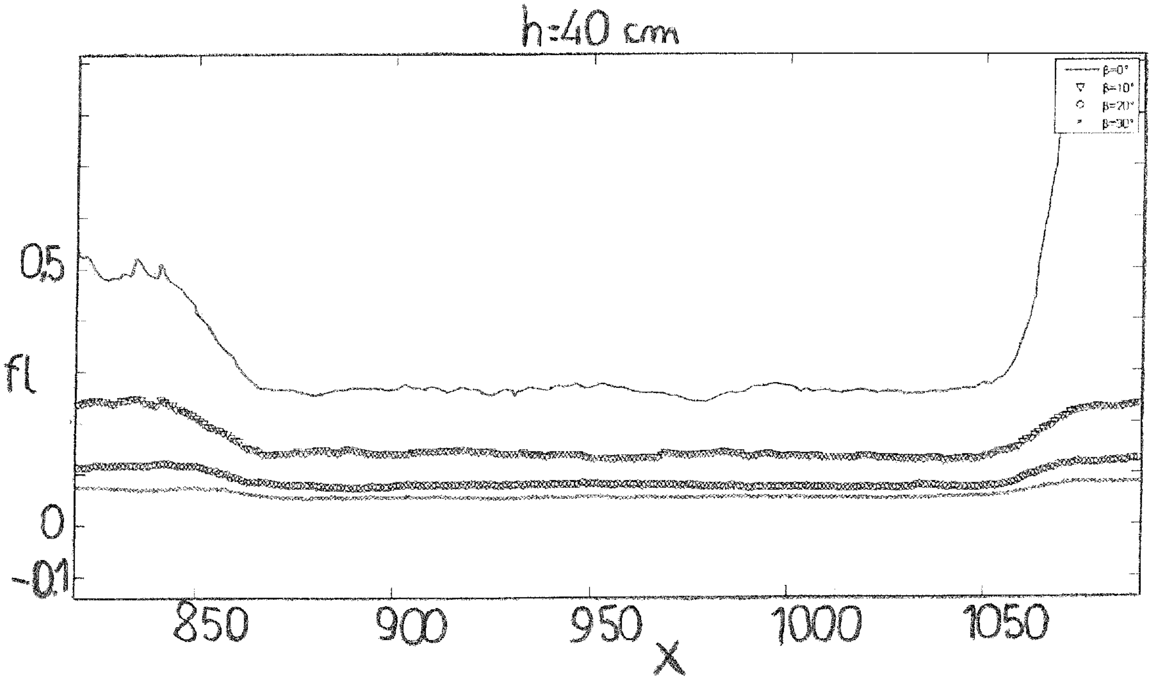

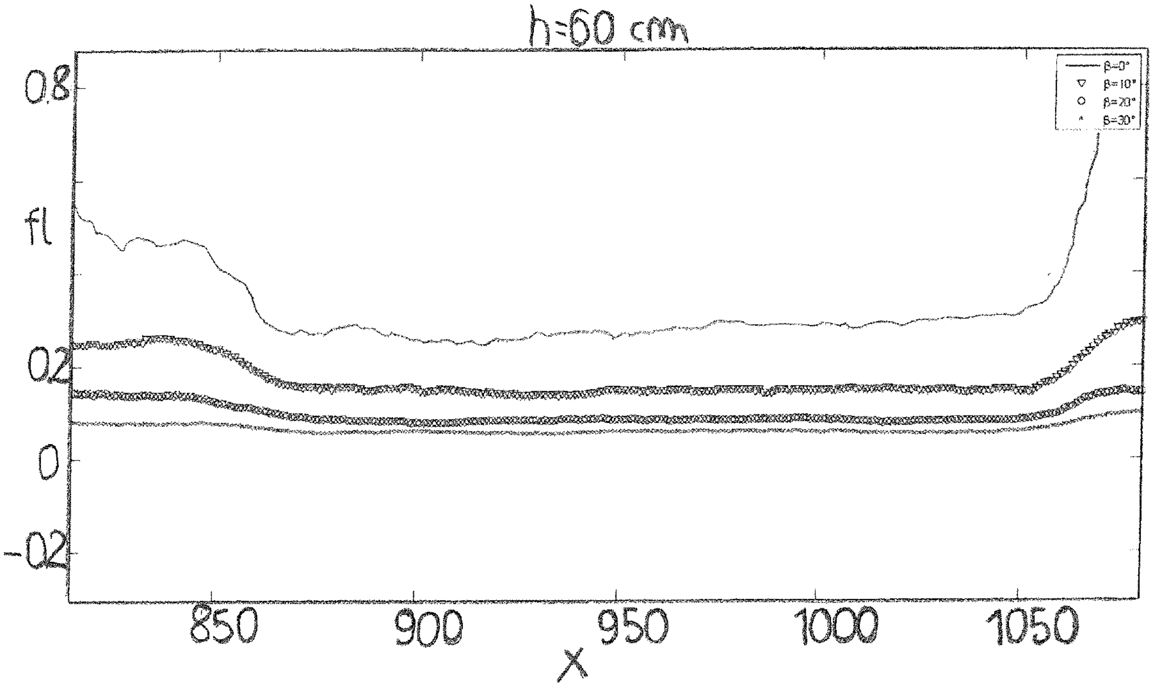
FIG.10
FIG.11
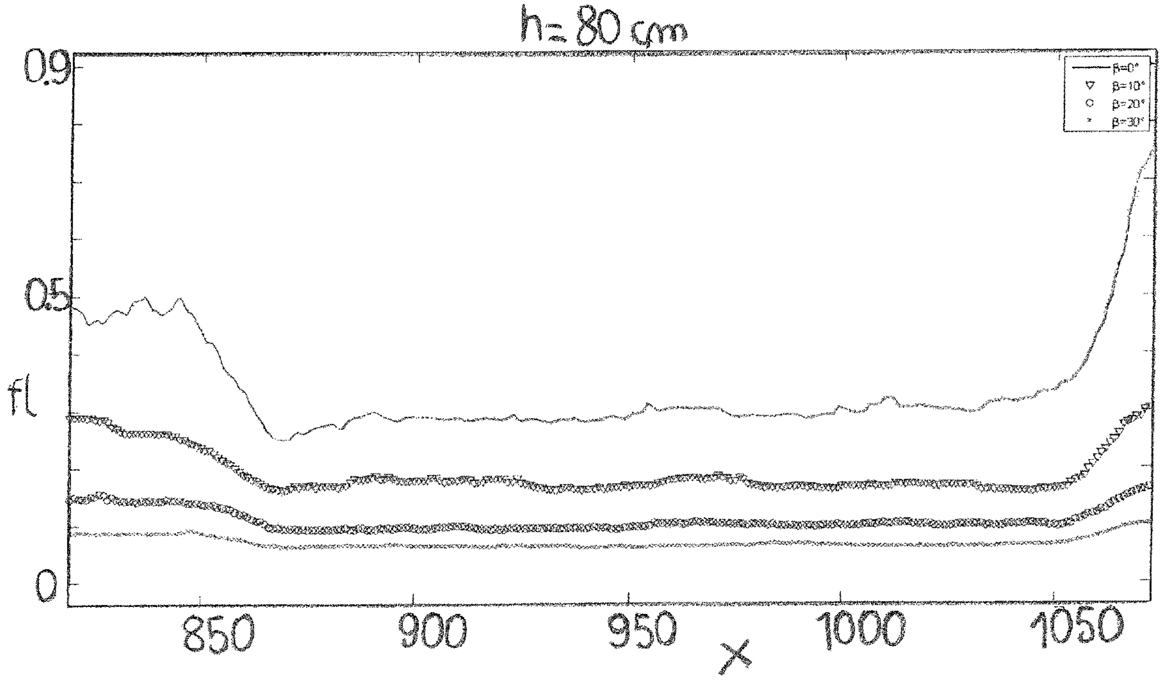

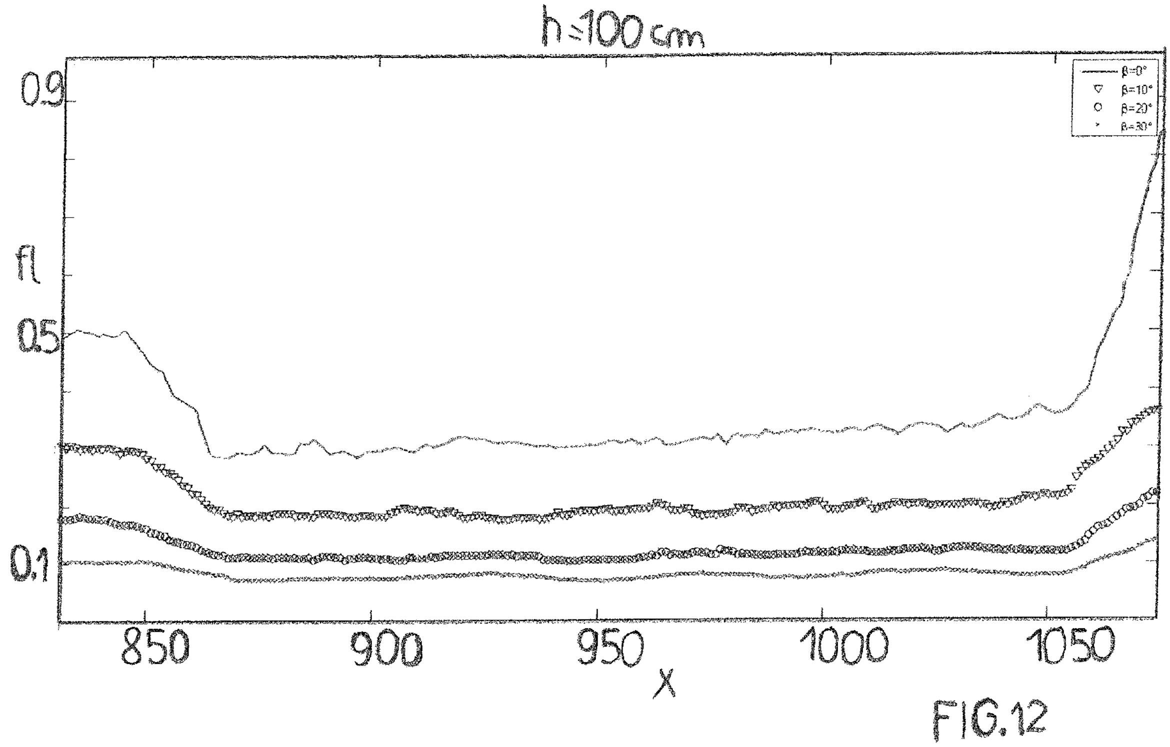
FIG.12
FIG.13
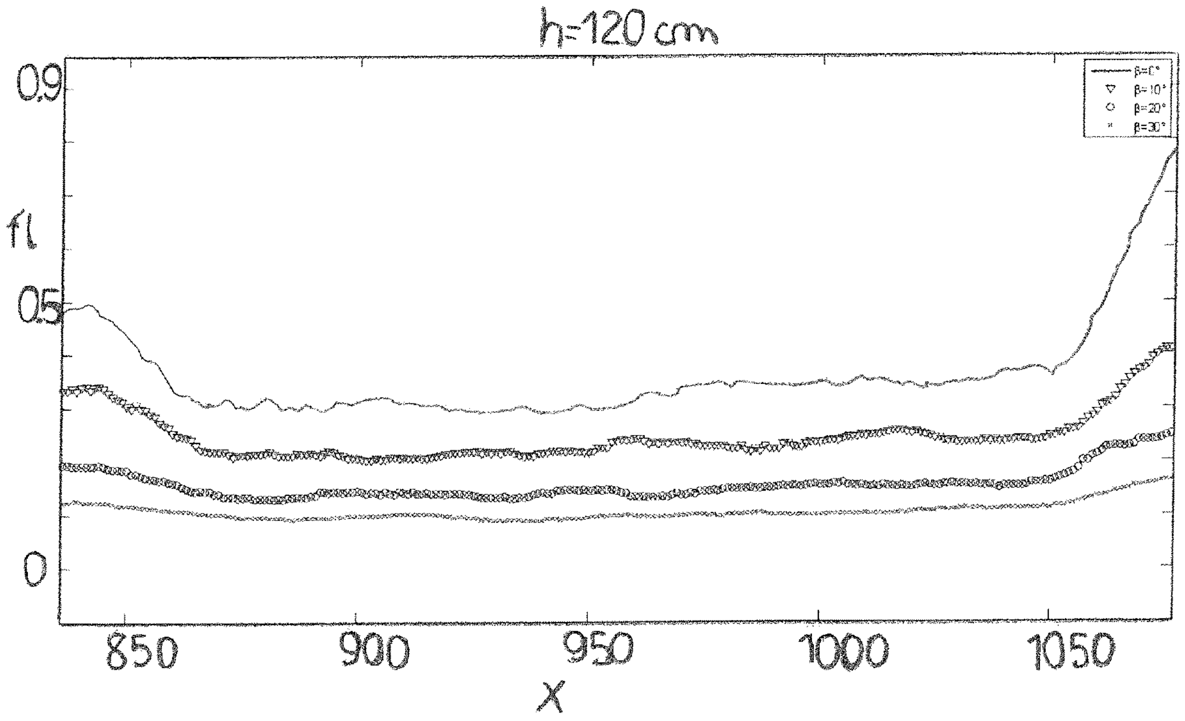

SYSTEM FOR ILLUMINATING A CARRIAGEWAY IN A CASE OF FOG

FIELD OF THE INVENTION

The present invention relates to the technical sector concerning road safety barriers.

In particular the present invention relates to a system for illuminating a carriageway in a case of fog.

DESCRIPTION OF THE PRIOR ART

A road safety barrier, known as a "guard rail", which extends along a side of a carriageway and which, in turn, comprises: a plurality of re-directing elements for re-directing a vehicle which impacts against the road safety barrier; a plurality of support elements for supporting the plurality of re-directing elements.

In detail, each support element of the plurality of support elements is shaped as an upright which is planted in the ground, at a certain difference from one another, and the re-directing elements of the plurality of re-directing elements are shaped as undulating tapes that are fixed to the above-mentioned uprights in such a way as to be consecutive to one another. The undulating tapes are reciprocally fixed to one another so to form a continuous front.

Therefore, the road safety barriers of known type have the function of laterally containing the carriageway and redirecting the vehicles that impact against them.

Generally during the night only main roads are illuminated, while the other roads are not. Lighting a road is, in fact, expensive, as it requires: installing lamp posts along the carriageway to be lit; laying cabling to carry electrical energy to the lamp posts; and electrical energy for illuminating the lamp posts during the night.

Therefore, in the unlit roads, the driver can refer only to the headlights of his/her own vehicle to illuminate the carriageway.

However, in the particular case of atmospheric conditions of thick fog and dark, and thus poor visibility, the illumination provided by vehicle headlights is sufficient to light only the carriageway and the horizontal signage near the vehicle.

The lack of adequate illumination of the horizontal signage and the preceding vehicle can determine situations of danger, as it can increase the possibility that the driver can go off the road, or impact the vehicle in front of his/her own. In this last case, an impact can take place if the driver enters a bank of fog where a preceding vehicle is moving at a lower speed.

SUMMARY OF THE INVENTION

In the light of the above, the aim of the present invention consists at least in reducing the above-described drawbacks.

The above aims are attained by use of a system for illuminating a carriageway according to claim 1.

In the case of atmospheric conditions of thick fog, the light sources of the plurality of light sources can be activated in part, or at least partially illuminate the horizontal signage: for example, this can determine illuminated zones and dark zones, with intervals between them, advantageously generating a luminous guide that assists the driver, thus reducing the possibility of going off the road.

The fact that the light sources are activated only in specific atmospheric conditions of thick fog, and therefore of poor visibility, does not require the use of high quantities of electrical energy: this enables supplying the light sources of the plurality of light sources by means of photovoltaic panels, for example without its being necessary to carry electrical energy from the national grid. This advantageously simplifies the cabling.

Further, the light sources of the plurality of light sources are borne by the road safety barrier, so that the installation of lamp posts is not necessary.

Further, the driver of the vehicle is able to understand that he/she is about to reach a portion of carriageway where there are conditions of thick fog, as soon as he/she sees the illumination produced by the already-active light sources.

This reduces the chance of any impacting with the preceding vehicle, as the driver can reduce the speed well before entering a bank of fog.

Further, the light sources of the plurality of light sources are activated when the at least a fog density detecting device detects a fog density value of above a threshold value and this facilitates the driver who, when driving, will not be engaged to activate or deactivate the fog-lights of the vehicle.

The light beam, having a transversal direction to the extension axis of the road safety barrier, advantageously succeeds in passing through the bank of fog affecting the carriageway without setting off diffraction phenomena when encountering the bank of fog. At the same time, the collimated light beam, having a first angular opening on a vertical plane and a second angular opening on a horizontal plane, is such as to ensure adequate visibility of the horizontal signage so as to assist the driver of the vehicle during the passage of a portion of carriageway in which there are conditions of thick fog.

BRIEF DESCRIPTION OF THE DRAWINGS

Specific embodiments of the invention will be described in the following part of the present description, according to what is recited in the claims and with the aid of the appended tables of drawings, in which:

FIGS. 4-7 are views of the graphs of the lighting function, in which each graph has been obtained for a fixed angle of orientation of each light source of the plurality of light sources and on varying the value of the height from the ground, according to the system of the second embodiment;

FIGS. 8-13 are views of graphs of the lighting function, in which each graph has been obtained for a fixed height value from the ground and by varying the angle of orientation of each light source of the plurality of light sources, according to the system of the second embodiment.

DESCRIPTION OF PREFERRED EMBODIMENTS

Figure 1:
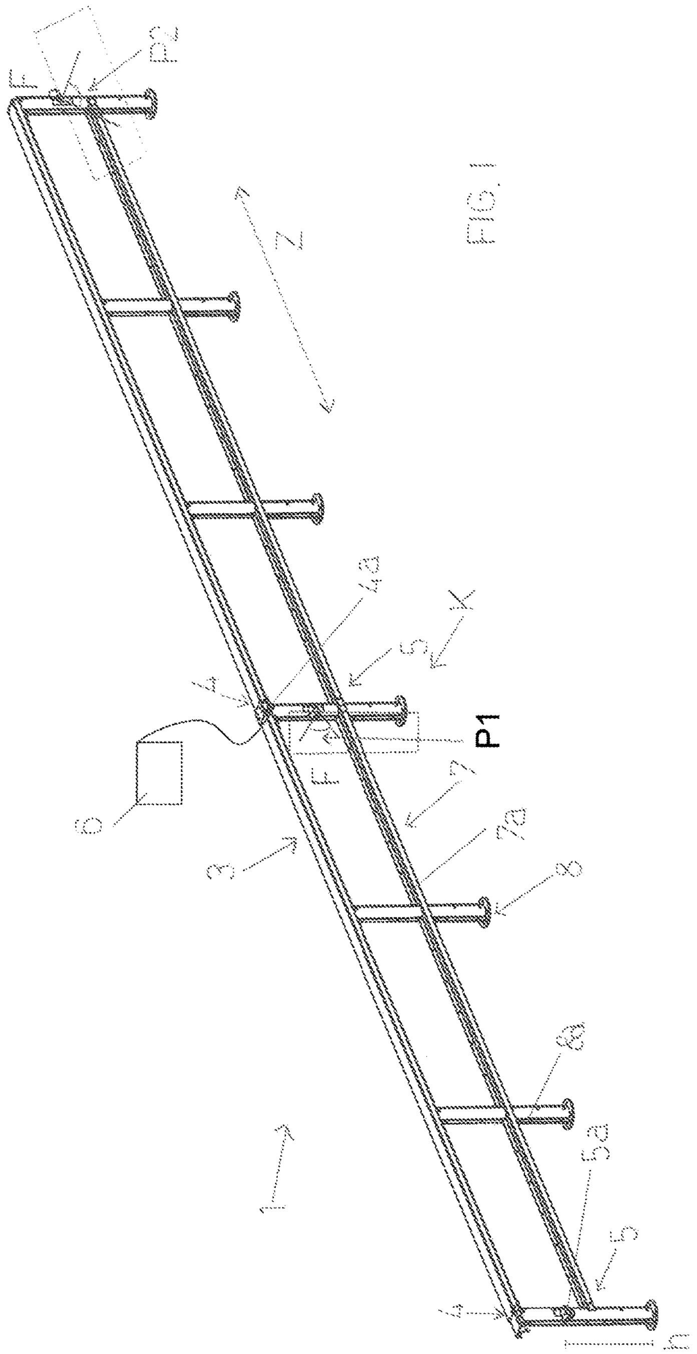
FIG. 1 is a perspective view of the system of the present invention, according to a first embodiment.

With reference to the appended tables of drawings, reference numeral (1) describes a system for illuminating a carriageway (2) in a case of fog.

The system (1) for illuminating a carriageway (2) comprises:

- a road safety barrier (3) which is arranged along a carriageway (2);

at least a fog density detecting device (4*a*) which is arranged along the road safety barrier (3);

a plurality of light sources (5) which are borne by the road safety barrier (3), which are distributed along the road safety barrier (3) and which are orientated so as each to emit a light beam (F) having a direction that is transversal to the extension axis (Z) of the road safety barrier (3);

a control unit (6) which is connected to the plurality of light sources (5) and to the at least a fog density detecting device (4*a*) which is configured to activate the light sources (5*a*) of the plurality of light sources (5) when the at least a fog density detecting device (4*a*) detects a fog density value of above a threshold value (see FIG. 1).

Further, the plurality of light sources (5) are orientated so as to illuminate the horizontal signage arranged on the carriageway (2) and each light source (5*a*) of the plurality of light sources (5) is designed to emit a light beam (F) which is collimated.

The light beam (F) has a first angular opening (P1) on a vertical plane and a second angular opening (P2) on a horizontal plane; the first angular opening (P1) is at most 30°; the second angular opening (P2) is at most 100° (see FIG. 1).

It is known that the collimated light beam is limited in terms of divergence.

In other words, a limited dispersion of the light beam (F) is ensured, even at long distances with respect to the light source (5*a*).

This is advantageous due to the fact that the vehicle (20) which precedes is partially illuminated only when it passes by a light source (5*a*) of the plurality of light sources (5): the driver of the vehicle (20) that follows can thus estimate the approximate distance of the preceding vehicle (20) by counting the number of light sources (5*a*) of the plurality of light sources (5) interposed between the two vehicles.

FIG. 1 illustrates a system (1) according to a first embodiment.

The system (1) for illuminating a carriageway (2) in a case of fog can be an illumination system (1) for lighting a carriageway (2) in the event of fog.

Figure 3:
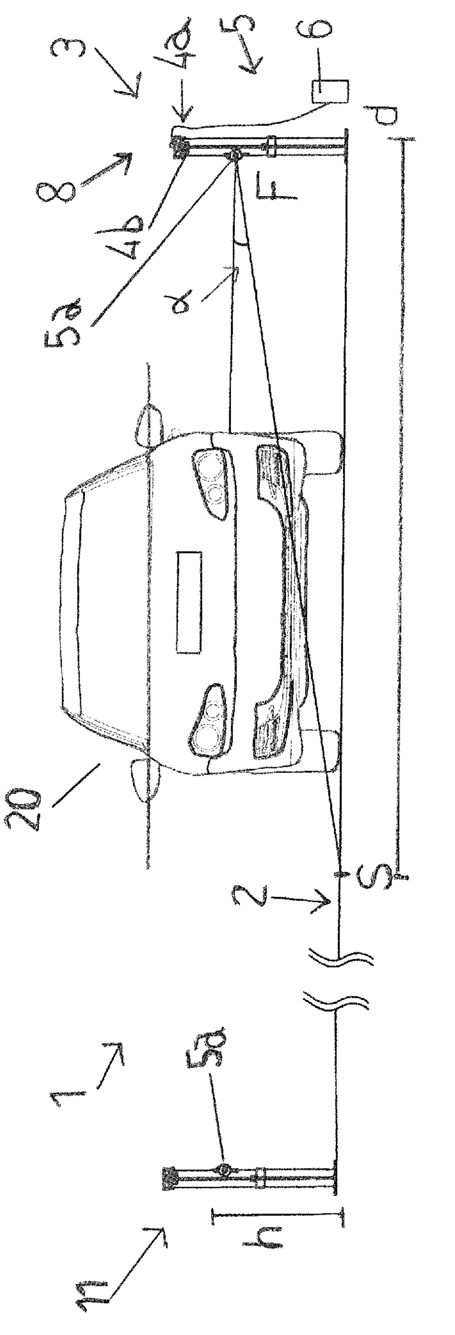
FIGS. 2 and 3 are views, respectively from above and frontal, of a system, according to a second embodiment, in which two road safety barriers are illustrated, one opposite the other along a carriageway, and a vehicle.
Figure 2:
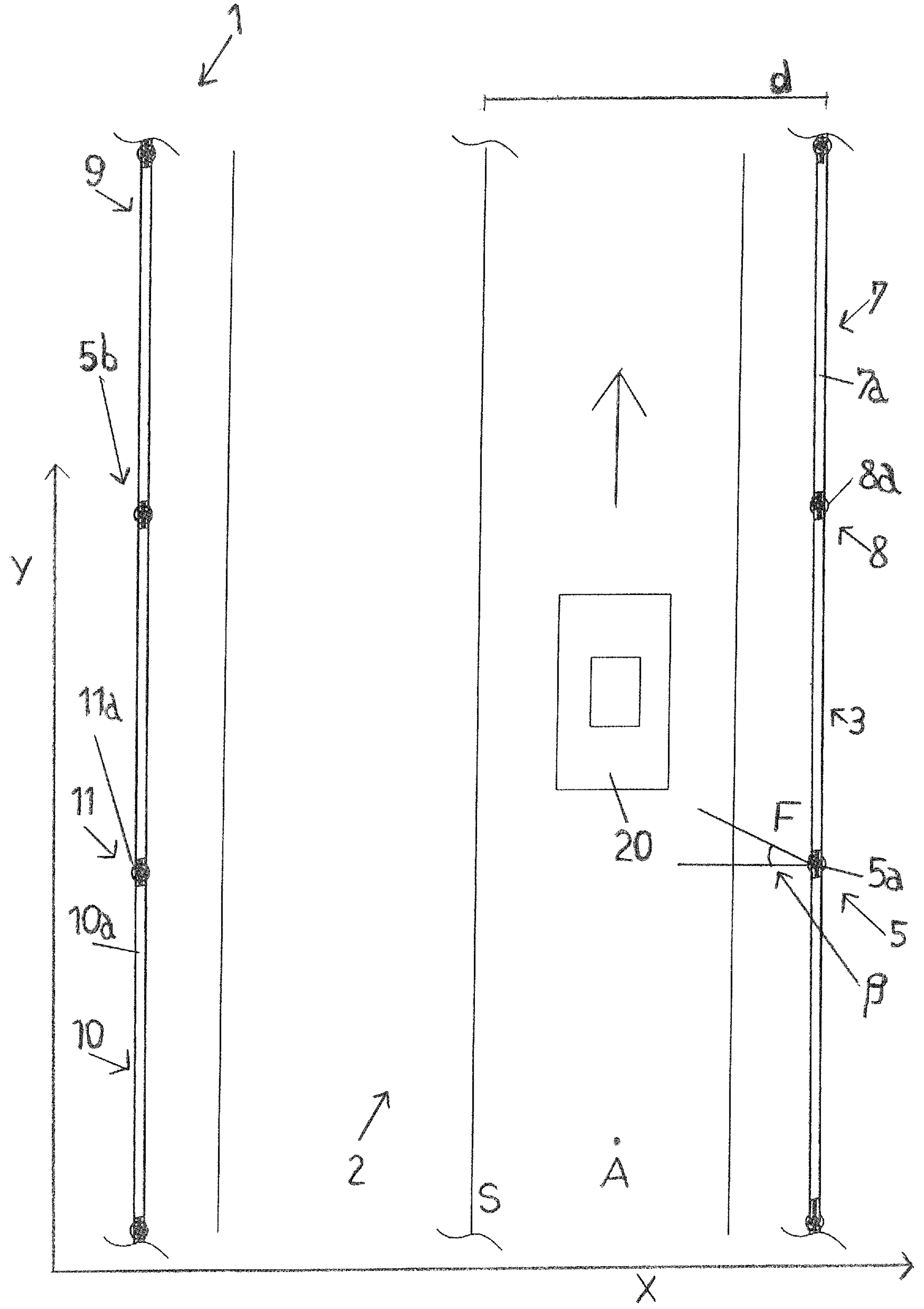

The system (1) can be arranged along the sides of a carriageway (2) (see FIGS. 2 and 3).

The road safety barrier (3) can be arranged along the sides of a carriageway (2) (see FIGS. 2 and 3).

Figure 1A:
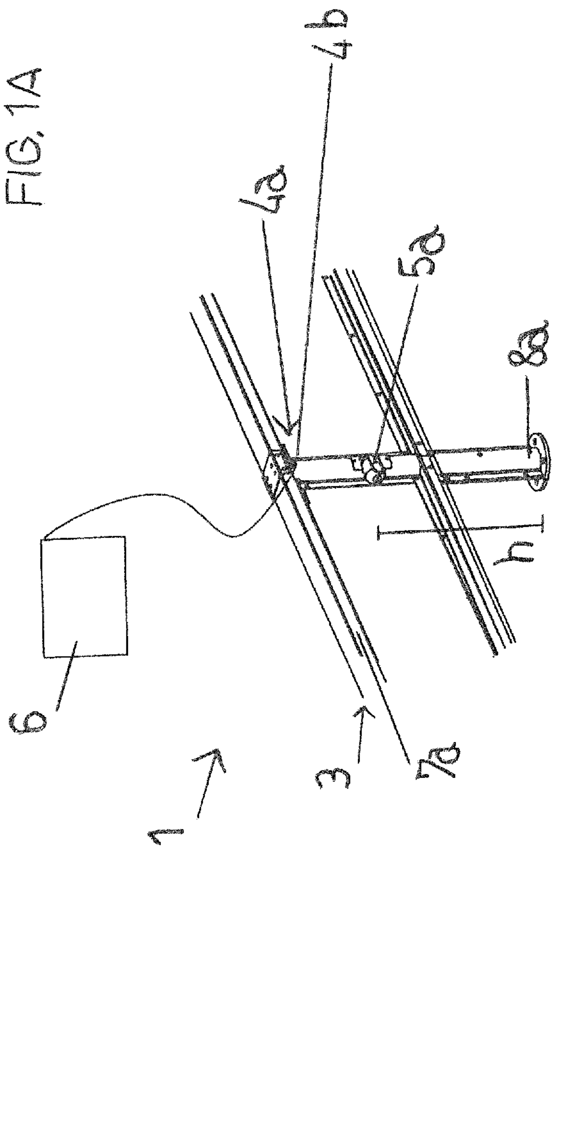
FIG. 1A is a view, of detail K of FIG. 1.

The at least a fog density detecting device (4*a*) can comprise a sensor (4*b*) for detecting a humidity value and a temperature value, in a determined time interval, and an electronic control board (not illustrated) for processing the detected values (see FIGS. 1 and 1A).

The control unit (6) can compare the humidity value and the temperature value detected with a series of values that it keeps in an internal memory, to determine the fog density value.

The fog density value can be calculated on the database relating to historical correlation archives between a determined humidity value and a determined temperature value, which are in the memory of the control unit (6).

The system (1) for illuminating a carriageway (2) in a case of fog can comprise a plurality of fog density detecting devices (4) that can comprise the at least a fog density detecting device (4*a*).

The fog density detecting devices of the plurality of fog density detecting devices (4) can be distributed uniformly along the road safety barrier (3) (see FIGS. 1 and 2).

The fog density detecting devices of the plurality of fog density detecting devices (4) can be arranged at a distance of 500 metres one from another.

The plurality of fog density detecting devices (4) can be carried by the road safety barrier (3).

The light sources (5*a*) of the plurality of light sources (5) can be uniformly distributed along the road safety barrier (3) (see FIGS. 1 and 2).

The light sources (5*a*) of the plurality of light sources (5) can be arranged at a distance of 12 metres from one another.

In detail, the control unit (6) receives the signal detected by the at least one detecting device of fog density (4*a*) and activate to light the light sources (5*a*) of the plurality of light sources (5).

The threshold value can correspond to a value for which the humidity value is in a percentage of 100% and the air transparency gives a 20 metre visibility. The at least a fog density detecting device (4*a*) is preferably associated to one or more light sources (5*a*) of the plurality of light sources (5) which are arranged in the vicinity of the at least a fog density detecting device (4*a*).

The control unit (6) is configured in such a way that, when the at least a fog density detecting device (4*a*) detects a fog density value of above a threshold value, the control unit (6) activates the one or more light sources (5*a*) of the plurality of light sources (5) which are associated to the at least a fog density detecting device (4*a*).

The automatic activation of the light sources (5*a*) of the plurality of light sources (5) advantageously facilitates the driver who, when driving, will not be forced to activate or deactivate the fog-lights, if present, of the vehicle.

The vertical plane is the one passing through each light source (5*a*) of the plurality of light sources (5) (see FIG. 1).

The vertical plane can be perpendicular to the extension axis (Z) of the road safety barrier (3).

The horizontal plane can be parallel to the plane of the carriageway (2).

The horizontal plane is the one passing through each light source (5*a*) of the plurality of light sources (5) (see FIG. 1).

Still more preferably, the first angular opening (P1) is at most 20°.

Still more preferably, the second angular opening (P2) is at most 90°.

Each light source (5*a*) of the plurality of light sources (5) is preferably arranged at a height from a ground surface (h) comprised between 10 cm and 120 cm.

Further, each light source (5*a*) of the plurality of light sources (5) is orientated at a first angle (β) comprised between 0° and 20°: with respect to a vertical plane which is perpendicular to the road safety barrier (3); and in the motion direction of the vehicle (20) moving along the carriageway (2) (see FIGS. 2 and 3).

The vertical plane is the one passing through the light source (5*a*) that emits the light beam (F).

Still more preferably, the height from the ground surface (h) is comprised between 20 cm and 100 cm.

In this way, with a height value from the ground surface (h) of above 20 cm, the possibility that grass or stones might interfere with one or more light sources (5*a*) of the plurality of light sources (5) is limited.

With a height from the ground surface (h) of less than 100 cm there is advantageously a limit to the possibility of the light beam (F) causing glare to the driver of the vehicle (20) travelling along the carriageway (2) on which the road safety barrier (3) is arranged.

In the configuration in which the system (1) extends along the sides of a carriageway (2) and the light sources (5*a*) of the plurality of light sources (5) are orientated each to emit a light beam (F) having a transversal direction to the extension axis (Z) of the road safety barrier (3) and are arranged at a height of not above 100 cm, it is possible to avoid the formation of glare phenomena against the driver, which might take place in a case where the light sources (5*a*) of the plurality of light sources (5) were orientated so as each to emit a light beam (F) directed frontally to the driver.

With the values of the first angle (3) and the height from the ground surface (h) mentioned in the foregoing, an adequate illumination of the horizontal signage and of the carriageway (2) are advantageously ensured in conditions of thick fog.

The choice of the above-mentioned values was made on the basis of experimental tests, which will be illustrated in the following.

Each light source (5*a*) of the plurality of light sources (5) can be orientated at a second angle (a): with respect to a horizontal plane which passes through the light source (5*a*) and which is perpendicular to the road safety barrier (3); and towards the horizontal signage (see FIG. 3).

Having fixed the value of the distance (d) between the road safety barrier (3) of the system (1) and the horizontal signage (S) which centrally delineates the carriageway (2) (i.e. the median line, see FIG. 2) and the value of the height (h) from the ground surface, it is possible to calculate the value of the second angle ($\alpha$) using the following trigonometric formula (see FIGS. 2 and 3):

$$h=d*tg\alpha$$

The road safety barrier (3) can comprise: a plurality of re-directing elements (7) for re-directing a vehicle (20) which impacts against the road safety barrier (3); a plurality of support elements (8) for supporting the plurality of re-directing elements (7); the plurality of light sources (5) is arranged on the plurality of support elements (8) (see FIG. 1).

Each re-directing element (7*a*) of the plurality of re-directing elements (7) can be a steel panel or a plastic panel. Alternatively, each re-directing element (7*a*) of the plurality of re-directing elements (7) can be a metal grid or metal longitudinal elements (not illustrated).

Each support element (8*a*) of the plurality of support elements (8) can have a vertical extension axis and can rise from the road in an upwards direction.

Each re-directing element (7*a*) of the plurality of re-directing elements (7) can be borne by each support element (8*a*) of the plurality of support elements (8).

The system (1) preferably comprises: a second road safety barrier (9); the road safety barrier (3) and the second road safety barrier (9) extend along the two opposite sides of a carriageway (2); at least a part of light sources (5*b*) of the plurality of light sources (5) is arranged along the second road safety barrier (9) (see FIG. 2).

FIG. 2 illustrates the above-described first embodiment.

When the carriageway (2) has two drive lanes, the road safety barrier (3) can advantageously be arranged to affect one drive lane and the second road safety barrier (9) can be arranged to affect the other drive lane, with the purpose of guaranteeing an adequate illumination of the carriageway (2), in conditions of thick fog, in both drive lanes.

The second road safety barrier (9) can comprise: a second plurality of re-directing elements (10) for re-directing a vehicle (20) which impacts against the second road safety barrier (9); a second plurality of support elements (11) for supporting the second plurality of re-directing elements (10); and wherein the at least a part of light sources (5*b*) of the plurality of light sources (5) is arranged on the second plurality of support elements (11) (see FIG. 2).

The same considerations as made above for the first plurality of re-directing elements (7) and for the first plurality of support elements (8) are also valid for the second plurality of re-directing elements (10) and for the second plurality of support elements (11).

Each light source (5*a*) of the at least a part of light sources (5*b*) is preferably arranged on the second road safety barrier (9) so as to be staggered with respect to each light source (5*a*) of the plurality of light sources (5) arranged on the second road safety barrier (3), when the road safety barrier (3) and the second road safety barrier (9) extend along the two opposite sides of a carriageway (2).

Along the carriageway (2) there are advantageously no dark zones, i.e. zones not affected by the illumination coming from each light source (5*a*) of the plurality of light sources (5).

The at least a fog density detecting device (4*a*) can be arranged along the road safety barrier (2).

FIGS. 4-13 are graphs illustrating the trend of the lighting function (fl): the axis of the X-axis is expressed in pixels and the Y-axis in lumens.

The graphs relate to simulations conducted by arranging the system (1) of the second embodiment of the present invention along a carriageway (2) and by sending a vehicle (20) along the carriageway (2), the vehicle having an average width value of 1.5 metres, in humidity conditions of 100% and with an air transparency giving a visibility of 20 metres.

FIG. 2 illustrates the driving direction with an arrow delineated on the carriageway (2).

The system (1) used for these tests includes the road safety barrier (3) on one side of the carriageway (2) and the second road safety barrier (9) on the other side of the carriageway (2) and includes that both are at a distance of 3.8 metres from the horizontal signage (S) which centrally delineates the carriageway (2) (see FIG. 2).

Further, the light sources (5*a*) of the plurality of light sources (5) arranged on the road safety barrier (3) are at a same distance from one another. In the same way, the light sources (5*a*) of the at least a part of light sources (5*b*) are arranged on the second road safety barrier (9) at a same distance from one another, equal to the distance between the light sources (5*a*) of the plurality of light sources (5) on the road safety barrier (3) (see FIG. 2).

Further, each light source (5*a*) is 12 metres distant from the following light source. Each light source (5*a*) emits a light beam (F) having an average power value of 400 lumens.

The vehicle (20) that passes along the carriageway (2) in the lane affected by the road safety barrier (3) is 2 metres distant from the light source.

The tests carried out were done by simulating a multiplicity of scenarios, on varying the value of the first angle ($\beta$) and the value of the height from the ground surface (h), wherein the vehicle (20) passing along the carriageway (2) is interposed between two light sources (5*a*) of the plurality of light sources (5).

A simulation was made to view these scenarios by positioning the point of view behind the vehicle (20) with respect to the drive direction, at a distance of 10 metres from the vehicle (20) itself, see reference (A) in FIG. 2.

The scenarios thus-obtained are illustrated in a schematic form in FIG. 3.

These scenarios enabled obtaining corresponding digital images constituted by pixels, each having a determined luminosity value.

All the graphs of FIGS. 4-13 show the lighting function (fl), expressed in lumens, along a segment which horizontally crosses the vehicle (20), as illustrated in FIG. 3.

FIG. 4 shows, in the same graph, six curves relating to the lighting function (fl) having a value, of the first angle, (β) equal to 0° and a value of the height from the ground (h), respectively, equal to 20 cm, 40 cm, 60 cm, 80 cm, 100 cm, and 120 cm.

FIGS. 5-7 are alike FIG. 4 but relate, respectively, to a value of the first angle (β) equal to 10°, 20°, 30°.

From these graphs it can be deduced that the optimal interval for the choice of the value of the height from the ground surface (h) is comprised between 10 cm and 120 cm, on the basis of the fact that the greater the step of the lighting function (fl) curve, at the end of the curve, the greater the perception of the vehicle (20) in front.

In other words, the more accentuated the step of the lighting function curve (fl), at the ends of the curve, the greater the contrast that there is between the luminosity relative to the portion of segment which does not strike the vehicle (20) and the luminosity relative to the portion of segment which strikes the vehicle (20).

FIG. 8 shows, in the same graph, four curves relating to the lighting function (fl) having a value, of the height from the ground surface (h) equal to 20 cm and a value of the first angle (p), respectively, equal to 0, 10°, 20° and 30°.

FIGS. 9-13 are alike FIG. 8 but are relative, respectively, to a value of the height from the ground (h) equal to 40 cm, 60 cm, 80 cm, 100 cm, and 120 cm.

In the same way, in these graphs too it is possible to deduce that the optimal interval for the choice of the value of the third angular opening (β) is comprised between 0° and 20°, on the basis of the fact that the greater the step of the lighting function (fl) curve, at the end of the curve, the greater the perception of the vehicle (20) in front.

In this case too, the more accentuated the step of the lighting function curve (fl), at the ends of the curve, the greater the contrast that there is between the luminosity relative to the portion of segment which does not strike the vehicle (20) and the luminosity relative to the portion of segment which strikes the vehicle (20).

On the basis of the above, further experimental tests were made, varying some parameters and conditions.

By way of example, the further tests were carried out with: the staggered arrangement of the light sources (5*a*) arranged on the road safety barrier (3) and on the second road safety barrier (9); the positioning of the vehicle (20) at a light source (5*a*) of the plurality of light sources (5); the non-uniform arrangement of the light sources (5*a*) of the plurality of light sources (5) along the road safety barrier (3) and the second road safety barrier (9); the activation of only the light sources (5*a*) of the plurality of light sources (5) arranged on the road safety barrier (3) which is arranged, in turn, along the drive lane of the vehicle (20).

Moreover, the further experimental tests carried out were also conducted using different values of: the width of the vehicle (20), the distance of the road safety barrier (3) and the second road safety barrier (9) from the horizontal signage (S) centrally delineating the carriageway (2) and the power of the light source.

The further experimental tests also demonstrated that the above-described ranges of values for the first angle (3) and for the height from the ground surface (h) are optimal.

The invention claimed is:

1. A system for illuminating a carriageway in a case of fog, comprising:

a road safety barrier which is arranged along a carriageway;

at least a fog density detecting device which is arranged along the road safety barrier;

a plurality of light sources which are borne by the road safety barrier, which are distributed along the road safety barrier and which are orientated so as to each emit a light beam having a direction that is transversal to the extension axis of the road safety barrier;

a control unit which is connected to the plurality of light sources and to the at least a fog density detecting device which is configured to activate the light sources of the plurality of light sources when the at least a fog density detecting device detects a fog density value of above a threshold value;

wherein:

the plurality of light sources are orientated so as to illuminate horizontal signage arranged on the carriageway;

wherein the light beam is substantially collimated;

the light beam has a first angular opening on a vertical plane and a second angular opening on a horizontal plane;

the first angular opening is at most 30°; and the second angular opening is at most 100°.

2. The system of claim 1, wherein:

the at least a fog density detecting device is associated to one or more light sources of the plurality of light sources which are arranged in the vicinity of the at least a fog density detecting device; and the control unit is configured in such a way that, when the at least a fog density detecting device detects a fog density value of above a threshold value, the control unit activates the one or more light sources of the plurality of light sources which are associated to the at least a fog density detecting device.

3. The system of claim 1, wherein each light source of the plurality of light sources is arranged at a height from a ground surface comprised between 10 cm and 120 cm; and wherein each light source of the plurality of light sources is orientated at a first angle comprised between 0° and 20° with respect to a vertical plane which is perpendicular to the road safety barrier and in the motion direction of a vehicle moving along the carriageway.

4. The system of claim 1, wherein the road safety barrier comprises:

a plurality of re-directing elements for re-directing a vehicle which impacts against the road safety barrier; and a plurality of support elements for supporting the plurality of re-directing elements;

and wherein the plurality of light sources is arranged on the plurality of support elements.

5. The system of claim 1, further comprising:

a second road safety barrier;

wherein:

the road safety barrier and the second road safety barrier extend along the two opposite sides of the carriageway; and at least a part of light sources of the plurality of light sources is arranged along the second road safety barrier.

6. The system of claim 5, wherein the second road safety barrier comprises:

a second plurality of re-directing elements for re-directing a vehicle which impacts against the second road safety barrier; and a second plurality of support elements for supporting the second plurality of re-directing elements;

wherein the at least a part of light sources of the plurality of light sources is arranged on the second plurality of support elements.

7. The system of claim 1, wherein the at least a fog density detecting device is borne by the road safety barrier.

* * * * *